United States Patent Office 3,200,831
Patented Aug. 17, 1965

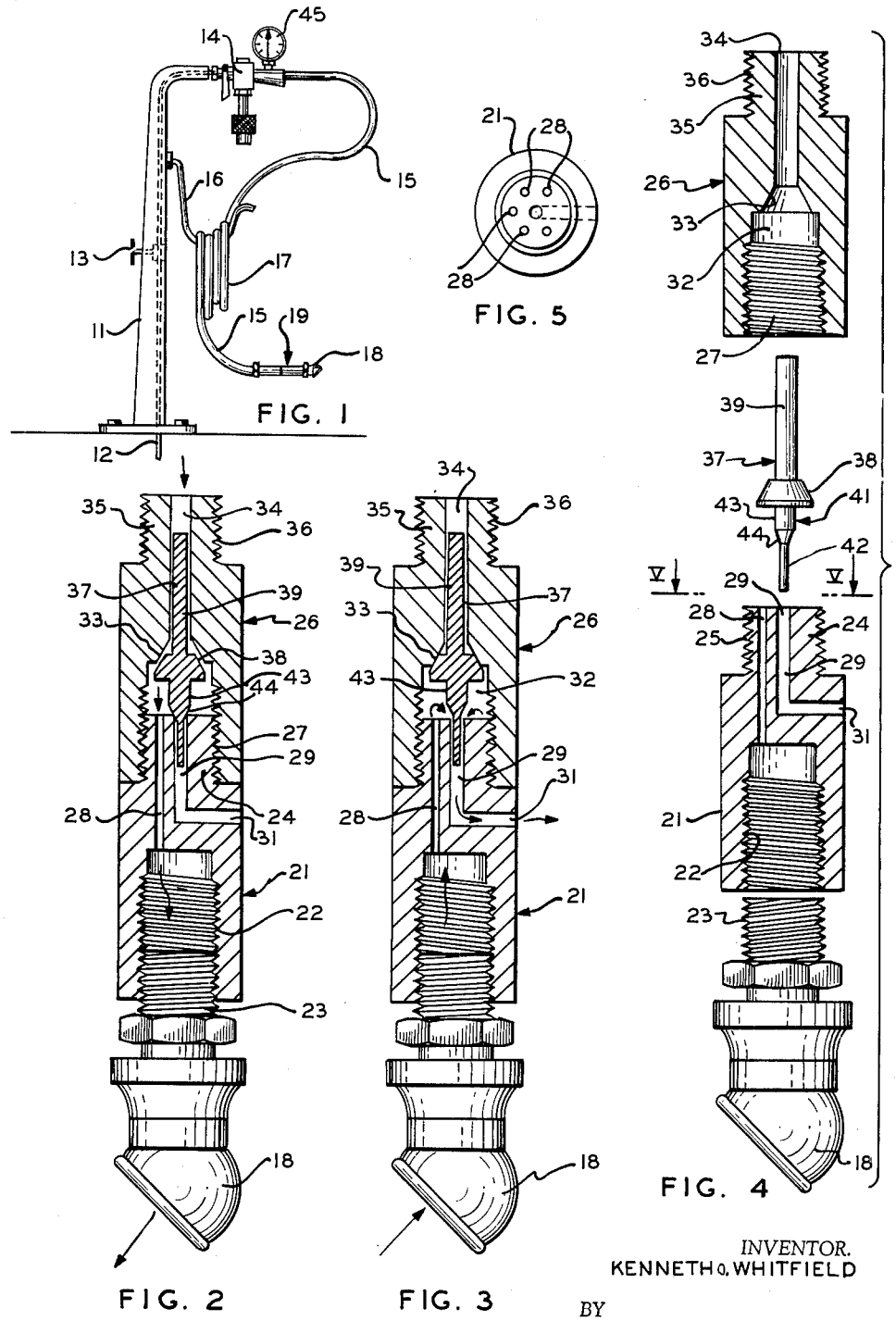

3,200,831
TIRE INFLATING DEVICE
Kenneth O. Whitfield, 175 Bloomfield Ave.,
Montclair, N.J.
Continuation of application Ser. No. 118,377, June 20, 1961. This application Sept. 27, 1963, Ser. No. 315,418
3 Claims. (Cl. 137—102)

This application is a continuation of my application, Serial No. 118,377, filed June 20, 1961, and similarly titled, now abandoned.

This invention relates to inflating means and, in particular, to the inflation of automobile tires and other containers to predetermined pressures.

An object of my invention is to provide a tire-inflating device comprising a valved fitting connectable between an air hose, desirably with a controlled air-pressure therein, and a valved air chuck adapted to fit the conventional valve of a pneumatic tire, said fitting including light normally-open valve means for allowing air to pass from said hose to said tire when the hose air pressure exceeds that in the tire, but allowing air to pass from said tire out of said fitting when the pressure in said tire exceeds that in said hose.

Another object of my invention is to provide a combined tire-inflating valved fitting and pressure-governor capable of permitting the escape of air from a tire if inflated to a greater extent than that desired, but allowing inflation of the tire up to a desired extent.

A further object of my invention is to provide a simple device, having only one moving part or valve, and for connection between a source of desirably controlled air pressure and a conventional tire valve, to reduce the pressure in the tire if too high, but otherwise to allow it to be inflated to a predetermined pressure.

These and other objects and advantages will become apparent from the following detailed description when taken with the accompanying drawings. It will be understood that the drawings are for the purpose of illustration and do not define the scope or limits of the invention, reference being had for the latter purpose to the appended claims.

In the drawings, wherein like reference characters denote like parts in the several views:

FIGURE 1 is an elevational view of a regulating device and valved fitting embodying my invention, used therewith and connected between the air hose from said device and a conventional valved air chuck adapted to fit the conventional valve of a pneumatic tire.

FIGURE 2 is an axial sectional view of the fitting, connected to a conventional valved air chuck shown in side elevation, the valve in said fitting being shown in normal release position for allowing air to pass from a source of desirably controlled air pressure through an air hose, the chuck, and a connected tire valve to its tire, as when the air in the tire is at a pressure lower than that in the hose.

FIGURE 3 is a view corresponding to FIGURE 2, but showing the light fitting valve in its closed or seated position, which it assumes when the air in the tire is at a pressure higher than that of the pressure in the air hose and thus acts to raise said valve.

FIGURE 4 is an exploded view of the parts of my device, otherwise as illustrated in FIGURES 2 and 3.

FIGURE 5 is a transverse sectional view, on the line V—V of FIGURE 4, in the direction of the arrows.

Referring to the drawings in detail, there is shown in FIGURE 1 an assembly of parts for practicing my invention. In this assembly, the reference character 11 denotes a standard or post through which a pipe 12 carrying compressed air extends, said pipe being controlled by a valve 13. Beyond the valve is a pressure regulator 14, which may be conventional or one such as designated by the reference character 7 in the Smith Patent No. 1,769,240. Such a regulator is adjustable so it may be set to deliver air at a desired pressure to a conventional air hose 15. I have shown a hook or support member 16 extending from the post 11 and over which a coil 17 of the hose 15 may be wound. The hose 15 terminates in a conventional valved air chuck 18, adapted to fit the conventional valve of an automotive pneumatic tire for supplying air thereto.

Inserted between the chuck 18 and the adjacent end of the hose 15 is a tire-inflating and pressure-controlling device or fitting generally designated 19 and embodying my invention. The device 19 consists of a body composed in part of a desirably cylindrical or tubular part 21 internally threaded, as indicated at 22, for connection with the externally threaded connector, end or extension 23 of the chuck 18. The other end of said tubular part 21 has a projection 24, which is externally threaded as indicated at 25 for connection with a valve-chambered part 26 which completes the body of the fitting 19. The part 26 is internally threaded as indicated at 27 for receiving the externally threaded part 24, and may be cylindrical and with a diameter corresponding with that of the part 21.

The part 21 is hollow and provided with a first port 28, consisting of one or more, in this case five, air ports or apertures which extend longitudinally, desirably parallel to the axis of the device 19 and are disposed around said axis, as most clearly shown in FIGURE 5. These apertures serve as ports between the parts 21 and 26 to allow for the flow of air one way or the other therebetween. The tubular part 21 also has an axial air port or aperture 29, the inner or normally lower end of which connects or merges with a lateral or radial air port or aperture 31 to, when so desired, allow for the escape of air from the valve chambered part 26 to the atmosphere.

The valve chambered part 26 has a valve chamber 32 terminating at its end remote from the tubular part 21 in a valve seat 33. The seat 33 is desirably tapered or contracted as it extends away from said chamber to merge with a second port or axial aperture 34, which opens at the normally upper end of the part 26, or that remote from the tubular part 21. At said end there is provided an extension 35 of reduced diameter, and externally threaded as indicated at 36 for connection with the adjacent end portion of the air hose 15. For that reason, the threads 36 and the size of the extension 35 may correspond with the threaded end extension 23 of the chuck 18.

Fitting the seat 33 is a valve 37, normally open as show in FIGURE 2, having a generally frusto-conical body portion 38, the angle of the taper or slope of said body portion corresponding with the taper and size of the seat 33. Thus, when said valve is engaged or closed, as shown in FIGURE 3, which, because of the light weight of said valve, occurs when the pressure of the air below slightly exceeds the pressure of the air above it, air is prevented from passing from the chamber 32 to the air hose 15. It will be understood that pressure differential needed to raise the valve depends on the weight of said valve and the lighter it is, the more readily it fluctuates under varying pressure. Loosely received in the aperture 34 is a valve extension 39, which insures alinement of the valve in the chambered part 26, but does not rest or seat on anything, thereby insuring noninterference with the air-tight engagement of the valve on its seat 33.

Extending from the valve body 38 in the direction opposite that of the extension 39, is an extension 41 with a relatively small end portion 42 which, at all times when the parts are assembled, is loosely received in the aperture 29 of the tubular part 21. This portion 42 connects with a larger part 43 along a tapered or frusto-conical portion 44. The portion 44 is such that when the valve 37 is unseated or opened, as viewed in FIGURE 2, it closes the aperture 29 against escape of air therethrough to the atmosphere.

From the foregoing disclosure of the construction of the parts embodying my invention, the operation thereof when using the same will be clear. After setting the pressure regulator 14 to a desired pressure, indicated by the gage 45, if it is desired to inflate a tire, the chuck 18 is applied to or over the valve of the tire. The valve stem of said chuck (not shown) opens and is opened by the valve stem in the tire, (not shown) in accordance with conventional practice.

If the air pressure in the tire is less than the pressure set for the air in the hose 15, the valve 37 will stay unseated in the gravity-biased position illustrated in FIGURE 2, allowing free flow of compressed air, as indicated by the arrows, through the aperture 34 to the valve chamber 32 and through the apertures 28, past the internal threads 22, into the threaded extension 23 of the chuck 18, and through the chuck and tire valves into the tire, until the pressure of the air in the tire equals that in the hose 15. When this occurs, the flow of air stops. There is at this time no escape of compressed air to the atmosphere through the axial aperture 29 and out of the radial aperture 31 because the tapered portion 44 of the valve 41 is seated on and closes the free or normally upper end of the aperture 29.

If, however, the pressure of the air in the tire is too high, that is, if it exceeds the pressure of the air in the hose 15 sufficiently to ovecome the slight bias of the valve 37, then air will flow from the tire through its valve, through the valve in the air chuck 18, as indicated by the arrows in FIGURE 3, through the tubular part 21 and the apertures 28 therein and on to the valve chamber 32, lifting or pushing the valve 37 against its seat 33. This action opens the aperture 29, so that air escapes through said aperture to the atmosphere at 31. This continues until the pressure of air in the tire is reduced to that of the air in the hose 15, and the valve 37 drops or closes the aperture 29. Thus, the pressure of air in the tire is reduced to that desired.

From the foregoing disclosure, it will be seen that I have provided a tire-inflating and pressure-controlling device, which is connectable between a compressed air hose and a conventional air chuck adapted to fit the conventional valve of a pneumatic tire. Said device is so constructed that it is usable without thought on the part of the operator, to either inflate a tire to the pressure desired or deflate it to that pressure, depending upon the pressure of the air in the tire being operated on. This is improvement over the conventional use in that, without my device, if the tire were over-inflated there would be no automatic release of air therefrom to deflate it to the extent desired, as is provided for by my invention.

It is desirable to have the air in the hose controlled and its pressure adjustably set to that desired, because of the necessity of inflating different tires to different pressures. However, for use with any one tire or number of tires, which it is desired to provide with air at a selected pressure, there would be no necessity for adjusting or changing the setting of the valve 14 or the pressure of the air in the hose 15. It is only when a change is made to a tire or group of tires requiring a different pressure, that the pressure of air in the hose 15 is correspondingly changed.

Having now described my invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A tire-inflating and pressure-controlling device with a body, one end of which is connectable to an air hose and the other end connectable to a valved air chuck adapted to fit the conventional valve of a pneumatic tire, said body consisting of a tubular part and a valve-chambered part, the former part being threaded at one end for connection to the latter part and at the other end for connection to a valved air chuck, said latter part having a chamber with a valve seat adjacent its end which is connectable to said hose, a normally open valve in said chamber movable between seating and release positions, a pressure-release aperture in said tubular part, an extension on said valve loosely received in said release aperture when the valve is seated and merging into a tapered part of said extension which closes said aperture when the valve is unseated, a port paralleling said aperture and extending longitudinally of said tubular part for transmission of air between a valved air chuck and said chambered part, a lateral aperture in said tubular part forming part of said release aperture for connection to the exterior thereof, said chambered part having an extension at one end threaded for connection to an air hose and through which extends a port beyond the valve seat and closed when said valve is seated, whereby when said device is connected to the valve of a tire to be inflated and the tire air pressure is exceeded by that in said port beyond the valve seat, the valve is unseated by pressure in said port and is constructed and arranged so that free flow of air through said chamber and into said port paralleling said release aperture is established, but the valve is seated when the pressure of air in a tire to be inflated exceeds the air pressure in said port in said other end sufficiently to raise the valve to its seat, unblocking said release aperture, whereby air may escape from said lateral aperture until equalization of said pressures occurs.

2. A tire-inflating and pressure-controlling device connectable between an air hose with controlled pressure therein and a valved air chuck adapted to fit the conventional valve of a pneumatic tire; said device having a body consisting of a tubular part and a valve-chambered part, the former being threaded at one end for connection with said chuck and at the other end for connection with said valve-chambered part, said other threaded end portion of the tubular part being apertured longitudinally for transmission of air between said chuck and chambered part and provided with an axial aperture from the end adjacent said chambered part and a lateral aperture extending from said axial aperture to the outside of said tubular part, said chambered part having an axially apertured extension at one end threaded for connection with an air hose, the apertured portion terminating in a valve seat at the other end, a normally-open valve in said chambered part fitting said seat and having one longitudinal extension loosely received in the apertured extension, and another extension in the opposite direction tapered to a small portion which normally loosely fits the axial aperture in said tubular part but a larger portion thereof closes said aperture upon unseating of said valve, said valve being constructed and arranged so that flow of air is established from an air hose through said chambered and tubular parts, chuck and into a tire to be inflated, when the device is connected to a tire valve and the pressure in said apertured extension exceeds that in a tire to be inflated, but when the pressure of air in a tire to be inflated exceeds the pressure in said apertured extension, the valve is seated on said seat and unblocks said axial aperture so that the flow of air is established through said tubular part, said chambered part, and back through the axial aperture in said tubular part, to pass out of said lateral aperture until said pressures equalize.

3. A tire-inflating and pressure-controlling device with a body, one end of which is connectable to an air hose and the other end connectable to a valved air chuck adapted to fit the conventional valve of a pneumatic tire, said body being threaded at one end for connection to a valved air chuck and having a chamber with a valve seat adjacent its end which is connectable to said hose, a normally open valve in said chamber movable between seating and release positions, a pressure-release aperture in said body, an extension on said valve loosely received in said release aperture when the valve is seated and merging into a tapered part of said extension which closes said aperture when the valve is unseated, a first port paralleling said aperture and extending longitudinally of said body for transmission of air between a valved air chuck and said chamber, said body having an extension at the other end threaded for connection to an air hose and through which extends a second port beyond the valve seat and closed when said valve is seated, whereby when said device is connected to the valve of a tire to be inflated and the tire air pressure is exceeded by that in said second port, the valve is unseated by pressure in said second port and is constructed and arranged so that free flow of air through said chamber and into said first port is established, but the valve is seated when the pressure of air in a tire to be inflated exceeds the air pressure in said second port sufficiently to raise the valve to its seat, unblocking said release aperture, whereby air may escape from said release aperture until equalization of said pressures occurs.

References Cited by the Examiner
UNITED STATES PATENTS

| | | | |
|---|---|---|---|
| 190,030 | 4/77 | Gue | 137—102 X |
| 1,769,240 | 7/30 | Smith | 137—226 |
| 2,690,757 | 10/54 | Orchowski | 137—226 |
| 2,702,044 | 2/55 | Johnston | 137—102 |

MARTIN P. SCHWADRON, *Acting Primary Examiner.*
WILLIAM F. O'DEA, *Examiner.*